United States Patent [19]

Molenaar et al.

[11] Patent Number: 4,915,183

[45] Date of Patent: Apr. 10, 1990

[54] WEIGHING APPARATUS FOR MEASURING THE WEIGHT OF A LOAD

[75] Inventors: Ronald N. Molenaar, Heemskerk; Johannes Vermeij, Heiloo, both of Netherlands

[73] Assignee: Hoogovens Groep B.V., IJmuiden, Netherlands

[21] Appl. No.: 369,837

[22] Filed: Jun. 23, 1989

[30] Foreign Application Priority Data

Jun. 30, 1988 [NL] Netherlands .......................... 8801656

[51] Int. Cl.⁴ ........................ G01G 19/08; G06K 7/10
[52] U.S. Cl. .............................. 177/137; 177/DIG. 6; 235/462
[58] Field of Search .................. 177/137, 163, DIG. 6; 235/462

[56] References Cited

U.S. PATENT DOCUMENTS

| | | | |
|---|---|---|---|
| 3,145,291 | 8/1964 | Brainerd | 235/462 X |
| 3,541,310 | 11/1970 | Stites | 235/462 |
| 3,867,990 | 2/1975 | Askew | 177/137 |
| 4,216,837 | 8/1980 | Pryor et al. | 177/DIG. 6 |
| 4,621,664 | 11/1986 | Pryor et al. | |

FOREIGN PATENT DOCUMENTS

| | | |
|---|---|---|
| 2640283 | 3/1978 | Fed. Rep. of Germany . |
| 2344003 | 10/1977 | France . |
| 2385086 | 10/1978 | France . |
| 2436975 | 4/1980 | France . |

Primary Examiner—George H. Miller, Jr.
Attorney, Agent, or Firm—Stevens, Davis, Miller & Mosher

[57] ABSTRACT

For measuring the weight of a load of a load-carrier of at least one vehicle, which load-carrier is supported by at least one spring unit on a mobile substructure of the vehicle, weighing apparatus is provided with means for measuring the elastic deformation of the spring unit or units under the load. The measuring means includes a reference object mounted on the load-carrier. To avoid vulnerable equipment on the vehicle and to improve information obtained, the measuring means includes electrical observation means for non-contact observation of the position of the reference object. The electrical observation means being free of the vehicle.

15 Claims, 1 Drawing Sheet

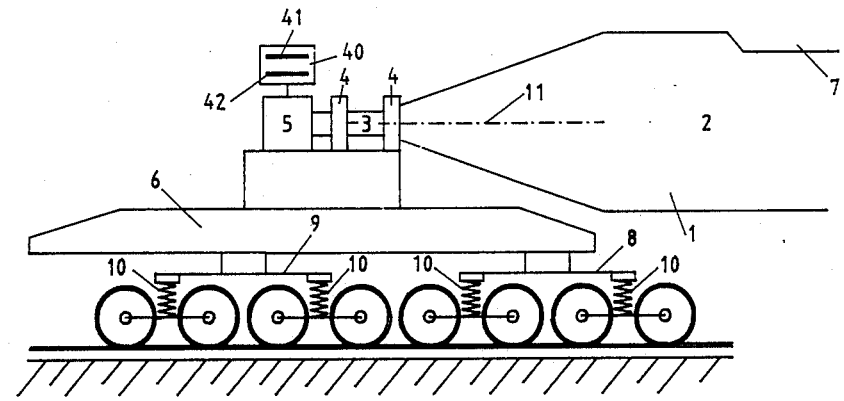
FIG: 1
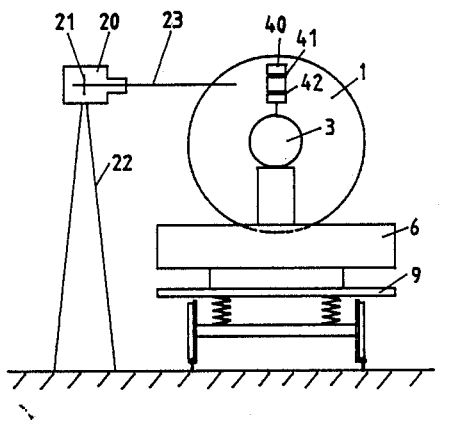
FIG: 2
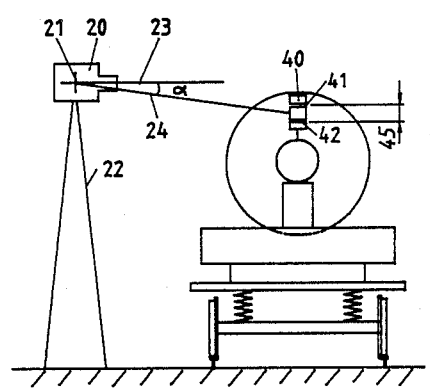
FIG: 3
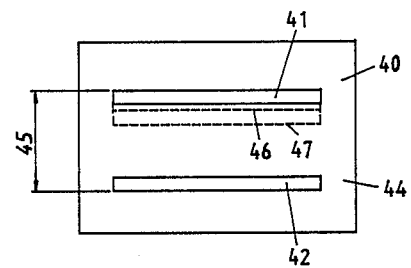
FIG: 4

WEIGHING APPARATUS FOR MEASURING THE WEIGHT OF A LOAD

BACKGROUND OF THE INVENTION

1. Field of the Invention

The invention relates to a weighting apparatus for measuring the weight of a load of a load-carrier of a vehicle, which load-carrier is supported by at least one spring unit on a mobile structure, e.g. a wheeled chassis or bogie of the vehicle. The invention is described below particularly with application to hot metal carriers, known as hot metal mixers or torpedo cars used in iron and steel works, but is not limited to this application.

2. Description of the Prior Art

A weighing apparatus for vehicle loads is known from FR-A-2,436,975. This has means for measuring the elastic deformation of the spring unit of the vehicle under the weight of the load. The measuring includes a reference object which is coupled to the load carrier. Specifically a measuring plate is fitted as reference object to the cargo compartment of a vehicle in the form of a railway wagon. A pack of leaf springs of the railway wagon forms the spring unit. Reference pointers are mounted on the measuring plate as well as on the pack of leaf springs. The relative positions of the reference pointers is a measure of the load in the railway wagon.

This known system has a number of disadvantages, in particular when it is used during the loading of a hot metal mixer. A hot metal mixer is a railway vehicle which is used for example in a combined blast furnace and steelworks for conveying molten pig iron of about 1650° C. from a blast furnace to a steel-making plant. The cargo compartment in a hot metal mixer is a mixer ladle, ellipsoid in shape. The mixer ladle is provided with trunnions by which it is located onto the wheeled substructures by means intervention of springs. The mixer ladle is provided with a filling hole.

To fill the hot metal mixer, it is positioned under the cast house of a blast furnace and an unscreened jet of pig iron from an iron runner coming out of the cast house items vertically through the filling hole into the hot metal mixer. As hot metal mixer is being filled, operators in the cast house monitor the pig iron from and there are no people in the immediate vicinity of the hot metal mixer. Consequently, with the known apparatus it is not possible to read off the weight of the charge of a hot metal mixer during loading, unless a worker is deployed specially to do so.

Another inconvenience of the known apparatus is that it is not provided with any electrical means for measuring and determining the weight of the charge.

SUMMARY OF THE INVENTION

The object of the invention is to provide a weighing apparatus which removes or reduces these inconveniences.

The weighing apparatus in accordance with the invention is characterized in that the measuring means comprises electrical observation means for non-contact scanning of the position of the reference object, e.g. by observation of the displacement of a visual image originating from the reference object relative to a mixed point such as the ground. The observation means is free of the vehicle, that is to say it is separate from or clear of the vehicle and it way be mounted at a fixed location e.g. on the ground.

With the weighing apparatus in accordance with the invention it is possible to measure electrically the position of the reference object relative to the wheeled substructure from a distance and without any contact with the vehicle. This avoids the presence of measuring equipment on board the vehicle. This is a great advantage with an unmanned railway vehicle, and particularly with a hot metal mixer, since measuring equipment often cannot withstand the conditions which prevail on board a railway vehicle. The weighing apparatus in accordance with the invention also avoids the need for measuring equipment on board the vehicle to be connected with plug connections to ground-based information processing equipment. Such plug connections, which are a source of disturbance in information transfer, are avoided. An output signal originating from the electrical observation means way be used for making visible at a distance the size of the charge and way be used for storing weight date for later processing. The weighing apparatus in accordance with the invention is suited to operation in the absence of operating personnel and so is also suited to use in an environment hostile to man.

In order to calibrate and check the weighing apparatus, the vehicle e.g. a hot metal mixer, way be weighed periodically by means of a weighbridge in a known manner, both empty and filed. Alternatively calibration can be performed by charging or discharging a known weight.

The visual or other image observed way be an image which is generated on the vehicle by an apparatus suited to do so, and which is recognized as reference object by the electric scanning apparatus. Moreover it is preferable to form the electrical signal by monitoring in the electric observation apparatus a reference object affixed to the vehicle with the aid of a light source outside the vehicle. In this case there is only a passive reference object present on the vehicle as part of the weighing apparatus. A passive reference object is very sturdy and simple to make. Then the weighing apparatus has no vulnerable parts in a hostile environment.

The reference object way be a hole, a shape or a sign, for example. The reference object is preferably at least one slot-shaped hole, e.g. in a flat plate which hole extends at least partly horizontally in its longitudinal direction and provides the observed image. This provides the advantage that the horizontal position of the vehicle relative to the observation means during measuring is not critical. When using the weighing apparatus with a hot metal mixer, this provides an extra advantage in that the relative position of the filling hole and the front runner may be deduced from the horizontal position and the reference object. In this way pig from spillage is prevented.

It is often desirable to display and to store information about the density of the vehicle on which the load is placed as mell as the weight of the load. For example, this is important for accounting for the value of a load and for following a product flow. Automatic identification of a vehicle is possible with an embodiment of the invention in which the weighing apparatus is provided with means for measuring at least one dimension of the reference object. By giving a dimension of the reverence object a characteristic and unique value for the vehicle, the vehicle way be identified by means of the weighing apparatus without any duplication. This way be realized in a very simple way by giving a slot-shaped hole forming each reference object a predetermined width which is characteristic to the vehicle.

Apart from the spread in the horizontal position during measurement, a spread way also occur in the vertical starting position of the reference object during measurement, for example as a result of vehicles differing from one another is a result of this, when calculating the displacement of the reference object an amine error way be introduced due to the displacement of the visual image. This potential angle error is eliminated when the reference object of the weighing apparatus in accordance with the invention comprises at least two slot-shaped holes which are spaced apart by a known distance, and the weighing apparatus is provided with means of measuring this distance. A known spacing of the two slots is associated with a known spacing of the images of the two slots. From the difference between the known and the measured spacing between the images of the two slots, the angle at which the images of the two slots are received on the observation apparatus way be calculated. With this known angle the displacement of a single image of a slot way be corrected in order to obtain the actual displacement of the slot. The dimension of a slot way also be calculated back to the actual dimension of a slot, thereby preventing identification errors when using the weighing apparatus for identifying a vehicle.

When being used with a hot metal mixer, this embodiment achieves a particular advantage in that the reference object is also fitted to the mixer ladle. With a known height of the hot metal mixer, it is then possible to calculate from the measured dimension, the angle which the surface of the reference object forms relative to the vertical surface. So in this way the vertical position of the filling hole on the mixer ladle is also known.

A simple and reliable embodiment of the invention is characterized in that the electrical observation means comprises an optical camera and means for ascertaining the position of the visual image of the reference object on the optical camera. In particular it is preferred that the optical camera comprises a "charge-coupled device camera". In particular a charge-coupled devices camera (CCD camera) is a sturdy means of scanning having no moving parts and with adequate accuracy is practical use. A CCD camera with a "linear array" of 1024 diodes has a resolution of 0.1% which is often sufficient for practical application of the weighing apparatus. A conventional video camera is also possible as optical camera.

In steel production the crude iron coming from a blast furnace is refined in a steelworks. To this end undesired chemical elements are removed from the pig iron by chemical and physical means. It is or advantage if a part of the process is already carried out during tapping from the blast furnace or in the hot metal mixer. Of particular advantage for this is a weighing apparatus in accordance with the invention which is provided with means for calculating the weight change per unit of time of the load carrier.

Such a weighing apparatus gives information about the present filling rate of the vehicle and so about the size of the present pig iron flow. The size of the pig iron flow is information needed in the refining process to be applied to the pig iron from the blast furnace or in the hot metal mixer.

In addition, the size of the pig iron flow is also important information for assessing the progress of ore reduction in the blast furnace. Weighing apparatus commonly used for this up to now is based on load cells on the hot metal mixer and have the disadvantage that they make use of electrical connections between the load cell and a ground-based processing apparatus and that they are very vulnerable when a mixer overflows or pig iron spills. Also static weigh bridges are too vulnerable for use beneath a blast furnace.

In one useful form of the invention, the observation means is associated with a plurality of vehicles, each having a reference object. Means way then be provided for recognition, from observation by said observation means, of respective reference objects of the vehicles which are provided with individually distinct reference objects, so as to identify the particular vehicle being observed.

The weighing apparatus way have data processing means including a data store holding information relating to a plurality of said vehicles having respectively different reference objects. The vehicles way be hot metal carriers and the information can relate to at least the identity each vehicle, the reference object of each vehicle, the spring characteristic of each vehicle. The data processing means way be arranged to calculate the spring characteristic of each said vehicle from data supplied relating to the weight of metal loaded into or discharged from the vehicle.

BRIEF INTRODUCTION OF THE DRAWINGS

The invention will be illustrated in the following by way of non-limitative example with reference to the accompanying drawing, in which:

FIG. 1 is a side view of a part of hot metal mixer incorporating an embodiment of the invention, FIG. 2 is an end view of the hot metal mixer of FIG. 1 and observation means, FIG. 3 is an end view of a hot metal mixer of smaller size and the observation means of FIG. 2, and FIG. 4 is a view of a reference object.

DESCRIPTION OF THE PREFERRED EMBODIMENTS

The same reference numbers in the Figures indicate elements or parts with corresponding functions.

In FIG. 1, there is shown part of the mixer ladle 1 of a hot metal mixer 2 (torpedo car). The mixer ladle 1 is provided at each end with a trunnion 3 which is located in bearing blocks 4.

The trunnion 3 ends in a gearbox 5 for rotating the mixer ladle around its longitudinal axis 11. The filling hole of the hot metal mixer is indicated at 7.

The frame 6 carrying the bearing blocks 4 is supported on two bodies 8 and 9 each having four axles. The bodies are provided with springs 10. A conventional hot metal mixer has an unladen weight of 375 tons and a nominal load of 450 tons. With a 450 ton charge the springs are compressed about 40 mm, or in other words with a 450 ton charge the mixer ladle drops by 40 mm relative to its unladen position. A reference object 40 is located on the gearbox 5 in the form of a flat plate provided with two parallel spaced apart slots 41 and 42. The reference object follows the movement of movement of the mixer ladle under the influence of the weight of the load.

FIG. 2 shows a charge-coupled device camera (CCD-camera) 20. A linear array in the camera is indicated by 21. The CCD-camera 20 is set up firmly on a tripod 22. The visual axis of the CCD-camera is indicated by 23.

By means of a light source, for which daylight or an artificial light source way be used, the optical image reference object 40 is recorded on the linear array 21 of the CCD-camera 20 by means of a set of lenses. The movement of the reference object as a result of a varying weight of the charge in the mixer ladle 1 causes a movement of the image in the CCD-camera. With the aid of a calculating apparatus, not shown in drawing, and by use of mathematical relationships from optics, the displacement of the reference object is calculated from the measured displacement of the image in the CCD-camera. It is possible to assess the actual weight in the mixer ladle from the know relationship between displacement of the reference object and weight in the mixer ladle which relationship may be ascertained once only and which way be checked periodically if required. If furthermore the weight change is specified per unit of time, information is then also obtained concerning the operation of the process in the blast furnace which is then being tapped into the mixer ladle.

FIG. 3 shows diagrammatically a front view of a hot metal mixer of a smaller format than that shown in FIG. 2 is can be seen in the drawing, the centre of the reference object 40 is, even in the unladen state, from the optical axis 23 of the CCD-camera 20. The connecting line from the centre of the reference object 40 to the centre of the linear array 21 is indicated by 24. The lines 23 and 24 together form an angle α. The spacing between the upper boundary side of slot 41 and the lower boundary side of slot 42 is known and indicated by numeral 45. From the relationship between the spacing recorded on the camera and the known spacing, the angle α may be calculated using trigonometry. Because the spacing o the slots of the reference object is recorded on the linear array at the same angle α, it is possible to calculate the actual spacing of the slots of the reference object from the measured spacing of the image in the camera.

FIG. 4 shows in detail the embodiment of the reference object 40 in the form of a rectangular flat plate 44. The plate 44 is provided with two rectangular slots 41 and 42 parallel to each other. When the reference object 40 is positioned on the vehicle, and because the slots 41, 42 extend horizontally, during measuring the horizontal position of the vehicle relative to the CCD-camera is not critical. The spacing or distance 45 between the highest boundary of slot 41 and the lowest boundary of slot 42 is known, the plate 44 is suitable for correction of any angle errors as described above.

In FIG. 4 the slots indicated by solid lines are the same size. At the same time the broken lines 46 and 47 indicate that slot 41 may be expanded downwards. This way of selecting a different size for slot 41 for each vehicle at a constant spacing 45, makes possible a simple method of identifying the vehicle. Of course, at the same time the size of the slot 42 way also be varied in order to increase the number of vehicles which can be individually distinguished.

The above embodiments way be applied to a system for weighing many torpedo cars, each of them having its own spring characteristic, and can eliminate the need for them to pass a weighing-bridge anywhere. Optical measurement is made using the photo-diode-array camera, of the spring deformation of the hot metal mixers, combined with optical recognition of each vehicle as described above. The weighing apparatus is associated with data processing means which stores and displays this information and additionally statistically establishes the spring characteristic of each vehicle individually from the poured-out weight. This poured-out weight is established in the hot metal ladle (in the steel plant) into which the hot metal mixer discharges its contents. To explain this further, the hot metal mixer is not always emptied completely. It might contain a solidified lump and the refractory lining might wear (increase of internal volume). This affects only the net weight and is not important for the weighing procedure, since the weighing procedure is based on measured spring deformation during filling and not on absolute spring deformation. In the steel plant the torpedo car is emptied into the hot metal ladle, the weight of which is measured by means of load cells. The measured weight of the hot metal ladle is used to determine the spring characteristic for each torpedo car. In practice the spring characteristic is established statistically, e.g. by taking the average value over a great number of measurements per torpedo car. In this way there is no need to use a weighing bridge.

The data processing means establishes, for each hot metal mixer individually the loading speed (weight increase per unit of time during loading) and the loaded weight, taking into account the data mentioned above.

What is claimed is:

1. Weighing apparatus for measuring the weight of a load of a load-carrier of at least one vehicle, which load-carrier is supported by at least one spring unit on a mobil substructure of the vehicle, said weighing apparatus having means for measuring the elastic deformation of the spring unit or units under the load, said measuring means comprising a reference object mounted on the load-carrier and electrical observation means for non-contact observation of the position of the reference object, said electrical observation means being free of the vehicle.

2. Weighing apparatus according to claim 1, wherein the reference object is at least one slot-shaped hole extending at least partly horizontally in its longitudinal direction and providing a visual image to be observed by the observation means.

3. Weighing apparatus according to claim 2 wherein the weighing apparatus is provided with means for calculating the weight change per unit of time of the load carrier.

4. Weighting apparatus according to claim 1, wherein the reference object comprises at least two slot-shaped holes spaced apart by a predetermined distance and the weighing apparatus is provided with means for measuring said distance.

5. Weighing apparatus according to claim 4 wherein the weighing apparatus is provided with means for calculating the weight change per unit of time of the load carrier.

6. Weighing apparatus according to claim 1 wherein the weighing apparatus is provided with means for measuring at least one dimension of the reference object.

7. Weighing apparatus according to claim 6 wherein the weighing apparatus is provided with means for calculating the weight change per unit of time of the load carrier.

8. Weighing apparatus according to claim 1 wherein the electrical observation means comprises an optical camera and means for ascertaining the position of a visual image of the reference object on the optical camera.

9. Weighing apparatus according to claim 8 wherein the optical camera comprises a charge-coupled device camera.

10. Weighing apparatus according to claim 9 wherein the weighing apparatus is provided with means for calculating the weight change per unit of time of the load carrier.

11. Weighing apparatus according to claim 8 wherein the weighing apparatus is provided with means for calculating the weight change per unit of time of the load carrier.

12. Weighing apparatus according to claim 1 wherein the weighing apparatus is provided with means for calculating the weight change per unit of time of the load carrier.

13. Weighing apparatus according to claim 1 having means for recognition from observation by said observation means, of respective reference objects of a plurality of said vehicles which are provided with individually distinct reference objects, so as to identify the particular vehicle being observed.

14. Weighing apparatus according to claim 1 having data processing means arranged to calculate the spring characteristic of each said vehicle from data supplied relating to the weight of metal loaded into or discharged from the vehicle.

15. Weighing apparatus according to claim 14 wherein said data processing means include a data store holding information relating to a plurality of said vehicles having respectively different reference objects, said vehicles being hot metal carriers and said information relating to at least the identity of each said vehicle, the reference object of each said vehicle, the spring characteristic of each said vehicle.

* * * * *